United States Patent
Kasprzyk et al.

(10) Patent No.: US 10,603,974 B2
(45) Date of Patent: Mar. 31, 2020

(54) HYDRAULIC DAMPER WITH A HYDRAULIC STOP ARRANGEMENT

(71) Applicant: BeijingWest Industries Co., Ltd., Beijing (CN)

(72) Inventors: Dominik Kasprzyk, Cracow (PL); Piotr Grzegorz Maton, Cracow (PL); Pawel Edward Kus, Cracow (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 16/138,827

(22) Filed: Sep. 21, 2018

(65) Prior Publication Data

US 2019/0322151 A1  Oct. 24, 2019

Related U.S. Application Data

(60) Provisional application No. 62/662,203, filed on Apr. 24, 2018.

(51) Int. Cl.
*F16F 9/49* (2006.01)
*B60G 17/08* (2006.01)
(Continued)

(52) U.S. Cl.
CPC ............ *B60G 17/08* (2013.01); *B60G 13/08* (2013.01); *F16F 9/185* (2013.01); *F16F 9/3214* (2013.01);
(Continued)

(58) Field of Classification Search
CPC ......... B60G 17/08; B60G 13/08; F16F 9/185; F16F 9/3214; F16F 9/3221; F16F 9/3235;
(Continued)

(56) References Cited

U.S. PATENT DOCUMENTS 3,583,712 A  6/1971  Domros et al.
3,656,414 A  4/1972  Muller
(Continued)

FOREIGN PATENT DOCUMENTS

CH  482953  1/1970
DE  287694  3/1914
(Continued)

OTHER PUBLICATIONS

Extended European Search Report dated Oct. 21, 2019 for counterpart European patent application No. EP19168330.9.

*Primary Examiner* — Thomas W Irvin
(74) *Attorney, Agent, or Firm* — William H. Honaker; Dickinson Wright PLLC

(57) ABSTRACT

A damper assembly includes a main tube disposed on a center axis and defines a fluid chamber for containing a working fluid. A main piston is disposed in the fluid chamber dividing the fluid chamber into a rebound and a compression chamber. A piston rod is attached to the main piston for moving the main piston between a compression stroke and a rebound stroke. An additional piston is attached to the piston rod adjacent to the main piston. The additional piston includes a body having an upper and a lower member defining a groove. A sealing ring is disposed in the groove and being radially expandable in response to a working fluid pressure. The sealing ring includes at least one annular collar extending outwardly from the sealing ring for forming a locking engagement with the upper and lower members to limit the radial expansion of the sealing ring.

15 Claims, 3 Drawing Sheets

(51) Int. Cl.
  *B60G 13/08* (2006.01)
  *F16F 9/18* (2006.01)
  *F16F 9/32* (2006.01)
  *F16F 9/36* (2006.01)
  *F16F 9/48* (2006.01)
  *F16F 9/348* (2006.01)

(52) U.S. Cl.
  CPC .......... *F16F 9/3221* (2013.01); *F16F 9/3235* (2013.01); *F16F 9/368* (2013.01); *F16F 9/483* (2013.01); *F16F 9/49* (2013.01); *B60G 2202/24* (2013.01); *B60G 2206/41* (2013.01); *B60G 2206/7104* (2013.01); *B60G 2500/10* (2013.01); *B60G 2800/162* (2013.01); *F16F 9/348* (2013.01); *F16F 2224/0291* (2013.01); *F16F 2228/066* (2013.01); *F16F 2228/14* (2013.01)

(58) Field of Classification Search
  CPC .... F16F 9/368; F16F 9/483; F16F 9/49; F16F 2230/42
  See application file for complete search history.

(56) References Cited

U.S. PATENT DOCUMENTS

| | | | |
|---|---|---|---|
| 4,595,182 A | 6/1986 | Freitag et al. | |
| 5,799,759 A * | 9/1998 | Koch | F16F 9/0245 188/288 |
| 6,311,813 B1 | 11/2001 | Lauderbach et al. | |
| 7,111,711 B2 * | 9/2006 | Grundei | F16F 9/3214 188/288 |
| 9,593,697 B2 * | 3/2017 | Baalmann | F16F 9/49 |
| 9,605,726 B2 * | 3/2017 | Baldoni | B60G 15/062 |
| 9,657,803 B2 * | 5/2017 | Slusarczyk | B21D 22/20 |
| 9,822,837 B2 * | 11/2017 | Groves | B60G 15/068 |
| 10,107,352 B2 * | 10/2018 | Grzesik | F16F 9/3221 |
| 10,208,830 B2 * | 2/2019 | Bruno | F16F 9/3465 |
| 10,393,211 B2 * | 8/2019 | Grzesik | F16F 9/3214 |
| 2015/0247549 A1 * | 9/2015 | Takeno | F16F 9/585 188/297 |
| 2015/0330475 A1 * | 11/2015 | Slusarczyk | F16F 9/3235 188/288 |
| 2016/0153517 A1 | 6/2016 | Lizarraga Senar | |
| 2018/0223942 A1 * | 8/2018 | Kus | F16F 9/516 |
| 2019/0162266 A1 * | 5/2019 | Flacht | F16F 9/18 |
| 2019/0186584 A1 * | 6/2019 | Flacht | F16F 9/49 |

FOREIGN PATENT DOCUMENTS

| | | |
|---|---|---|
| DE | 1027478 B | 4/1958 |
| DE | 1818006 | 3/1977 |
| DE | 102005030403 A1 | 1/2007 |
| DE | 102005030403 | 4/2007 |
| DE | 102017215687 A1 | 3/2019 |
| EP | 2952775 A2 | 12/2015 |
| FR | 900921 | 7/1945 |
| FR | 1488517 | 7/1967 |
| GB | 854465 | 11/1960 |
| GB | 905517 | 9/1962 |
| WO | 2016030775 A1 | 3/2016 |

* cited by examiner

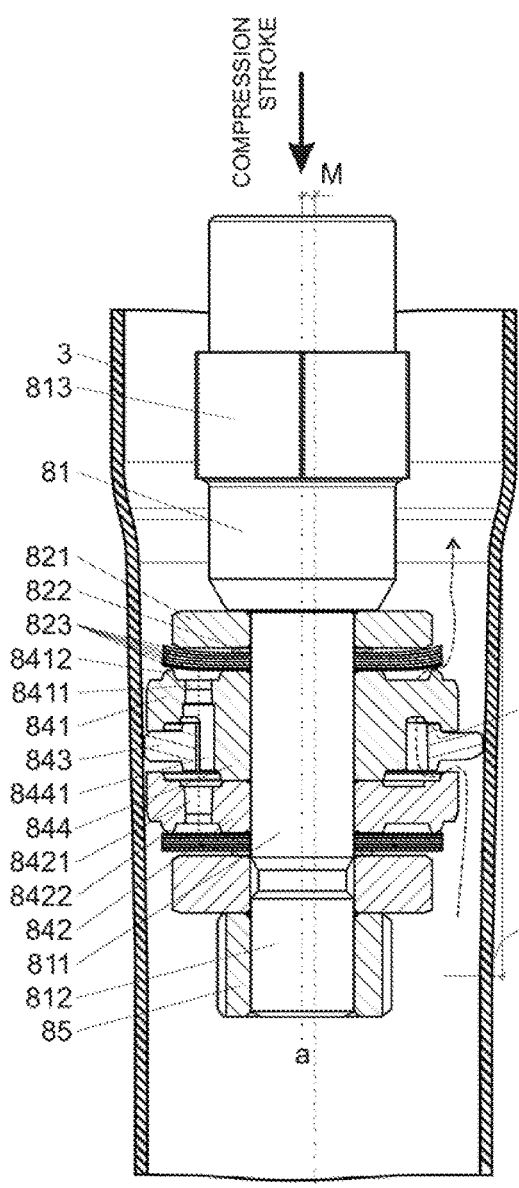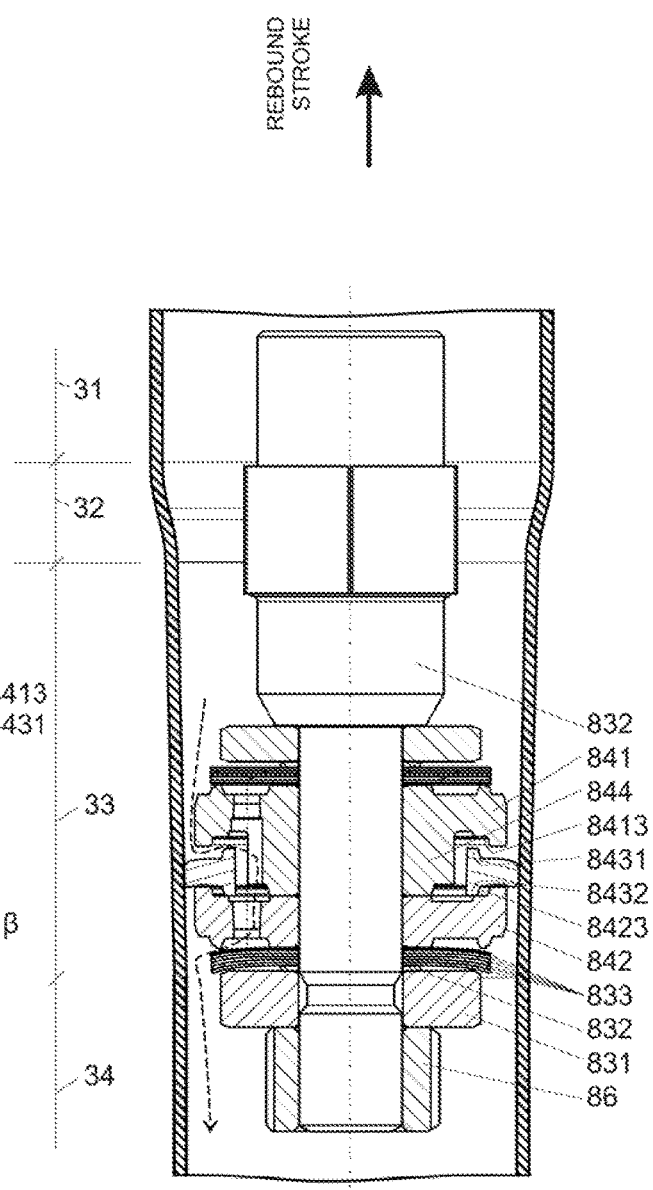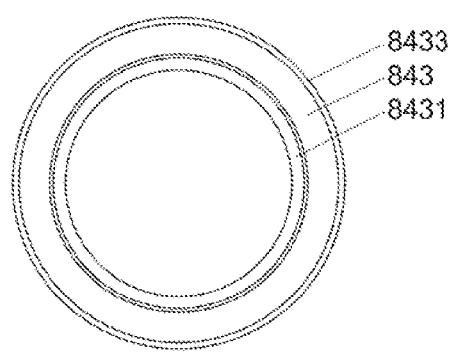

HYDRAULIC DAMPER WITH A HYDRAULIC STOP ARRANGEMENT

CROSS REFERENCE TO RELATED APPLICATION

This application claims the benefit of U.S. Provisional Patent Application Ser. No. 62/662,203 filed on Apr. 24, 2018, the entire disclosure of which is incorporated herein by reference in its entirety.

BACKGROUND OF THE INVENTION

1. Field of the Invention

The present invention generally relates to a damper assembly for a vehicle.

2. Description of the Prior Art

Damper assemblies are well known in the art for use in a vehicle. One such a damper assembly is disclosed in patent publications EP 2 302 252 or EP 2 952 775. The damper assembly includes a hydraulic stop arrangement which provides progressive generation of additional damping force depending not only on the additional piston position but also on its velocity, which may be tunable to a large extent.

U.S. Provisional Patent application US 62/456,283 discloses a damper assembly including a main tube disposed on a center axis and extending between a first end and a second end defining a fluid chamber for containing a working fluid. A main piston is slidably disposed in the fluid chamber dividing the fluid chamber into a rebound chamber and a compression chamber. The compression chamber extends between the first end and the main piston. The rebound chamber extends between the second end and the main piston. A piston rod is disposed on the center axis and is attached to said main piston for moving the main piston between a compression stroke and a rebound stroke. An additional piston is attached to the piston rod, adjacent to the main piston, for providing additional damping force. The additional piston includes a body having an upper member and a lower member and defines a groove between the upper member and the lower member. A sealing ring disposed in the groove between the upper member and the lower member for movement in the groove with the sealing ring being radially expandable in response to a working fluid pressure to engage the main tube during the compression stroke and the rebound stroke.

The sealing ring must be axially displaceable to provide the predefined flow of working liquid during the rebound stroke and the compression stoke. At the same time, the sealing ring must be radially displaceable to compensate any dimensional and assembly misalignments between the narrowed section of the tube and the axis of the additional piston assembly.

Unfortunately these requirements are contradicting and thus the sealing ring expanding radially under pressure of the working liquid is prone to be extruded or squeezed into to a space between the narrowed section of the tube and the additional piston assembly. The inventors observed such an undesirable effect that resulted in failure of the entire damper during benchmark tests.

SUMMARY OF THE INVENTION

The present invention provides a damper assembly having an additional piston having progressive and tunable increase of damping force in dependence of rod displacement, that would be robust and reliable, would cost efficient and simple to manufacture and the hydraulic stop arrangement might be applied as an add-on in existing damper constructions. The present invention also provides a damper assembly that reduces hydraulic imbalance and minimizes the influence of any possible misalignment of the sealing ring to prevent the extrusion of the sealing ring into the space between the main tube and the upper member. The present invention limits the radial expansion of the seal ring in response to an increase in the working fluid pressure to improve the durability of the sealing ring. The present invention further provides a sealing ring of the additional piston of the damper assembly having an increased stiffness.

The damper assembly includes a main tube disposed on a center axis and extending between a first end and a second end defining a fluid chamber for containing a working fluid. A main piston is slidably disposed in the fluid chamber dividing the fluid chamber into a rebound chamber and a compression chamber. The compression chamber extends between the first end and the main piston. The rebound chamber extends between the second end and the main piston. A piston rod is disposed on the center axis and is attached to said main piston for moving the main piston between a compression stroke and a rebound stroke. An additional piston is attached to the piston rod, adjacent to the main piston, for providing additional damping force. The additional piston includes a body having an upper member and a lower member and defines a groove between the upper member and the lower member. A sealing ring disposed in the groove between the upper member and the lower member for movement in the groove with the sealing ring being radially expandable in response to a working fluid pressure to engage the main tube during the compression stroke and the rebound stroke. The sealing ring includes an outer surface facing the main tube, an upper surface facing the upper member, and a lower surface facing the lower member. At least one annular collar extends outwardly from the sealing ring for forming a locking engagement with the upper member and the lower member and limits the radial expansion of the sealing ring.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is an enlarged cross-sectional view of the additional piston of the damper during a compression stroke;

FIG. 4 is an enlarged cross-sectional view of the additional piston of the damper during a rebound stroke; and FIG. 5 a top view of the sealing ring of the additional piston of the damper.

DESCRIPTION OF THE ENABLING EMBODIMENT

Figure 1:
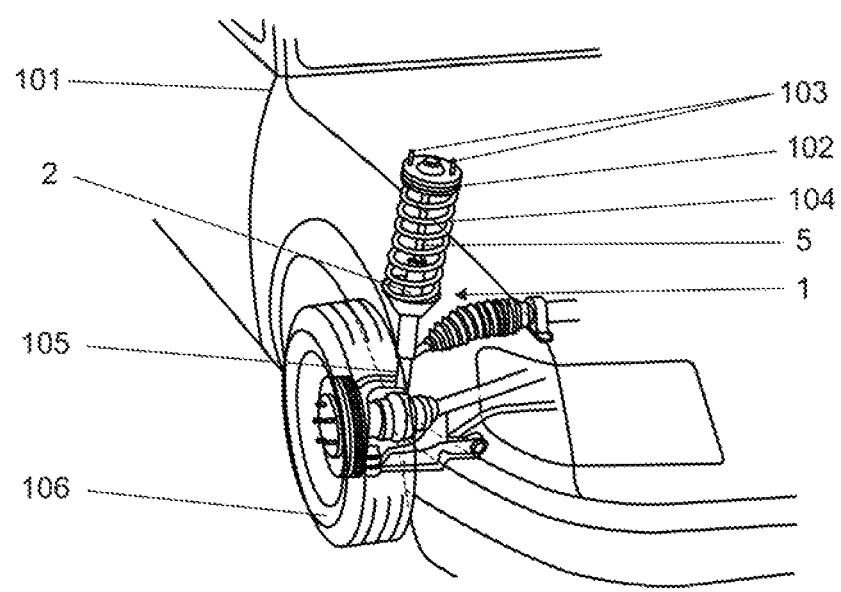
FIG. 1 is fragmentary view of a vehicle suspension including the damper in accordance with the present invention.

Referring to the Figures, wherein like numerals indicate corresponding parts throughout the several views, it is one aspect of the present invention to provide a damper assembly 1 for a vehicle. A generally illustrated in FIG. 1, the damper assembly 1 is attached to a vehicle chassis 101 by a top mount 102. A number of screws 103 is disposed on the periphery of the upper surface of the top mount 102 to fasten the top mount 102 to the vehicle chassis 101. The top mount 102 is connected to a coil spring 104 and a piston rod 5 of the damper assembly 1. The damper assembly 1 is also connected to the knuckle 105 supporting the vehicle wheel 106.

The damper assembly 1 includes a main tube 3, having a generally cylindrical shape, disposed on a center axis A between a first end and second end. The damper assembly 1 defines a fluid chamber 11, 12 extending along the center axis A between the first end and the second end for containing a working fluid. An external tube 2, having a generally cylindrical shape, is disposed on the center axis A spaced from the main tube 3 and extending about the main tube 3 between a closed end and an opened end. The closed end is disposed adjacent to the first end. The opened end is adjacent to the second end defining a compensation chamber 13 extending annularly about the center axis A between the main tube 3 and the external tube 2 and in fluid communication with the fluid chamber 11, 12. It should be appreciated that a base valve (not shown) can be attached to the first end of the main tube 3 for restricting the flow of the working fluid between the fluid chamber 11, 12 and the compensation chamber 13. A bushing 6, having a sleeve 7, is disposed at the closed end of the external tube 2 and attached to the closed end for connecting the damper assembly 1 to the knuckle 105 supporting the vehicle wheel 106. A piston rod guide (not shown) is disposed at the second end of the main tube 3 and the opened end of the external tube 2, in sealing engagement with the main tube 3 and the external tube 2, to close the fluid chamber 11, 12 and the compensation chamber 13.

A main piston 4, having a generally cylindrical shape, is slidably disposed in the fluid chamber 11, 12 and movable along the center axis A dividing the fluid chamber 11, 12 into a rebound chamber 11 and a compression chamber 12. The compression chamber 12 extends between the first end and the main piston 4 and is in fluid communication with the compensation chamber 13. The rebound chamber 12 extends between the second end and the main piston 4. A piston rod 5, having a generally cylindrical shape, is disposed on the center axis A and extends along the center axis A through the main piston 4 to a distal end spaced from the main piston 4 for moving the main piston 4 between a compression stroke and a rebound stroke. During the compressions stroke, the piston rod 5 and the main piston 4 move toward the first end of the main tube 3 and the closed end of the external tube 2. During the rebound stroke, the main piston 4 and the piston rod 5 move toward the second end of the main tube 3 and the opened end of the external tube 2.

It should be appreciated that the term "compression" as used herein with reference to particular elements of the damper assembly 1 refers to these elements or parts of elements which are adjacent to (or facing) the compression chamber 12 or, in a case of working liquid flow direction, it refers to this flow direction that takes place during the compression stroke of the damper assembly 1. Similarly the term "rebound" as used in this specification with reference to particular elements of the damper assembly 1 refers to these elements or these parts of particular elements which are adjacent to (or facing) the rebound chamber 11 or, in a case of working liquid flow direction, it refers to this flow direction that takes place during the rebound stroke of the damper assembly 1.

The main piston 4 has a compression surface and a rebound surface. The compression surface is disposed in the compression chamber 12 facing the closed end. The rebound surface is disposed in the rebound chamber 11 facing the opened end. The main piston 4 can include a plurality of passages having a set of inner passages and a set of outer passages for allowing the working fluid to flow through the main piston 4 during the compression stroke and the rebound stroke. The inner passages can be disposed adjacent to the center axis A and extends between the rebound surface and the compression surface. The outer passages can be radially spaced from the inner passages and extend between the rebound surface and the compression surface. The main piston 4 includes a first compression valve 42 and a first rebound valve 41 for controlling the flow of the working liquid while the main piston 4 is in motion. The first compression valve 42, including a plurality of discs each having a generally circular shape, is disposed on the rebound surface of the main piston 4 covering the outer passages for limiting the flow of the working fluid through the main piston 4 to provide a damping force during the compression stroke. The first rebound valve 41, including a plurality of discs each having a generally circular shape, is disposed on the compression surface of the main piston 4 covering the inner passages for limiting the flow of the working fluid through the main piston 4 to provide a damping force during the rebound stroke.

Figure 2:
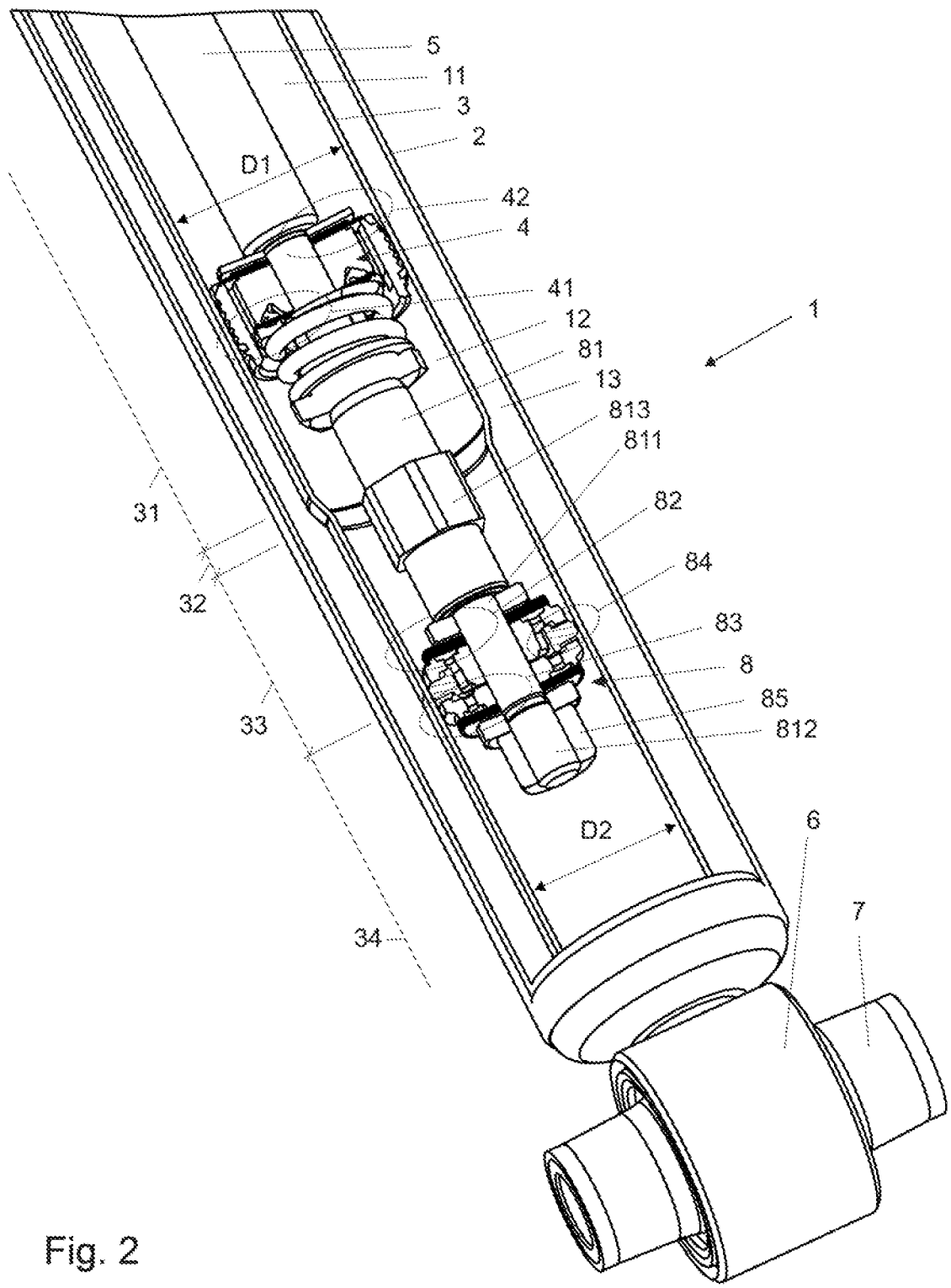
FIG. 2 is a cross-sectional perspective view of the damper.

An additional piston 8 is attached to the piston rod 5, spaced from the main piston 4, for providing additional damping force to avoid abrupt stop of the main piston 4. The additional piston 8 includes a rod extender 81, having a generally cylindrical shape, disposed on the center axis A and attached to the distal end of the piston rod 5 to fixate the main piston 4 on the piston rod 5. The rod extender 81 extends along the center axis A to a terminal end, axially spaced from the distal end of the piston rod 5. The rod extender 81 defines a torque application surface 813, having a generally hexagonal shape, for allowing a user to tighten the rod extender 81 against the piston rod 5 and adjust the length of the rod extender 81. As illustrated in FIG. 2, the additional piston 8 is coaxially fixed with the main piston 4 by the rod extender 81. In one embodiment, the rod extender 81 can be screwed onto the distal end of the piston rod 5, i.e. in thread engagement with the distal end of the piston rod 5, and thus fixing all the components of the main piston 4 together. To this end, the rod extender 81 can be provided with the torque application surface 813 which allows a user to adjust the length of the rod extender 81 and to change the activation point of the additional piston 8 with respect to the stroke position. Alternatively, it should be appreciated that the rod extender 81 can be attached to the distal end of the piston rod 5 by other methods such as welding.

As best shown in FIGS. 2-4, in one embodiment of present invention, the main tube 3 includes a main section 31, having a generally cylindrical shape, disposed on the center axis A and having a first predetermined diameter D1 of approximately 32 mm. While the additional piston 8 remains in the main section 31 of the main tube 3, it does not generate any substantial flow restrictions for the working liquid passing around it. The main section 31 extends from the second end of the main tube 3 along the center axis A to a first conical section 32. The first conical section 32 extends outwardly from the main section 31, along the center axis A and tapering from the main tube 3 toward the center axis A. The main tube 3 further includes a second conical section 33, extending outwardly from the first conical section 32 and along the center axis A, and tapering from the first conical section 32 at a predetermined angle β to a narrowed section 34 having a second predetermined diameter D2. In other words, the main section 31 of the main tube 3 transforms through a first conical section 32 to the second conical section 33 and the narrowed section 34 having the second predetermined diameter D2. As the piston rod 5 moves the main piston 4 and the additional piston 8 in the fluid chamber 11, 12, the first conical section 32 marks the entry of the additional piston 8, while both the second conical section 33 and the narrowed section 34 form a sliding surfaces for the additional piston 8. In one embodiment of the present invention, the predetermined angle β of the second conical section 33 is approximately 1.6 degree relative to the first conical section 32 to the narrowed section 34 to provide a smooth activation of the additional piston 8. The narrowed section 34 extends between the second conical section 33 and the first end of the main tube 3. The narrowed section 34 has the second predetermined diameter D2 of approximately 28 mm wherein the second predetermined diameter D2 is less than the first predetermined diameter D1. It should be appreciated that the narrowed section 34 can include at least one slot disposed in the rebound chamber and extending along the main tube 3 parallel to the center axis A to provide an additional tuning parameter.

A projection 811 extends outwardly from the terminal end of the rod extender 81, along the center axis A, to a projection end. It should be appreciated that the projection 811 can include an external thread 812 disposed adjacent to the projection end and extending helically about the center axis A. The additional piston 8 includes a body 84 attached to the projection 811. The body 84 includes an upper member 841 and a lower member 842, axially spaced from one another. A center portion 844 extends between the upper member 841 and the lower member 842 to connect the upper member 841 with the lower member 842. The center portion 844 defines a groove 8441 extending between the upper member 841 and the lower member 842 and annularly about the center axis A. It should be appreciated that the upper member 841, the lower member 842, and the center portion 844 can be formed in a single unit. It should also be appreciated that the body 84 can include the upper member 841 and the lower member 842 without the center portion 843.

As best illustrated in FIGS. 3 and 4, the upper member 841, having a generally circular shape, is disposed adjacent to and spaced from the terminal end of the rod extender 81. The upper member 841 extends radially outwardly and annularly about the projection 811 to an upper periphery spaced from the main tube 3. The center portion 844, having a tubular shape, extends outwardly from the upper member 841, along the center axis A and toward the projection end, to a primary end spaced from the projection end. The upper member 841 defining a plurality of upper channels 8411, disposed about and radially spaced from the center axis A, and extending through the upper member 841 for allowing the working fluid to flow through the upper member 841. In one embodiment of the present invention, the plurality of upper channels 8411 includes ten upper channels 8411 disposed circumferentially spaced from one another. The lower member 842, spaced from the upper member 841, disposed adjacent to the primary end of the center portion 844, having a generally circular shape, extends radially outwardly from and annularly about the center axis A to a lower periphery about the projection 811 and spaced from the main tube 3. The lower member 842 defines a plurality of lower channels 8421, disposed about and radially spaced from the center axis A, and in alignment with the upper channels 8411 and extends through the lower member 842 for allowing the working fluid to flow through the lower member 842. It should be appreciated that the lower channels 8421 can be circumferentially offset from the upper channels 8411. In one embodiment of the present invention, the plurality of lower channels 8421 includes ten lower channels 8421 disposed circumferentially spaced from one another and in alignment with the upper channels 8411 for allowing the working fluid to flow through the body 84 of the additional piston 8.

The additional piston 8 including a second compression valve 82 and a second rebound valve 83 for restricting the flow of the working fluid through the additional piston 8 during the rebound stroke and the compression stroke. The second compression valve 82, having a plurality of first deflective discs 823 each having a generally circular shape, is disposed between the rod extender 81 and the upper member 841 covering the upper channels 8411 for limiting the flow of the working fluid through the upper member 841 to provide a damping force during the compression stroke. It should be appreciated that, in one embodiment of the present invention, the plurality of first deflective discs 823 includes six discs. The upper member 841 includes an upper seat 8412 extending annularly outwardly from the upper member 841 along the center axis A in a direction opposite of the lower member 842 to receive the second compression valve 82. A first retainer 821 is disposed between the second compression valve 82 and the rod extender 81 and spaced from the second compression valve 82. A first spacer 822 is disposed between the first retainer 821 and the second compression valve 82 to allow the second compression valve 82 to deflect in response to a working fluid pressure during the compression stroke.

The second rebound valve 83, having a plurality of second deflective discs 833 each having a generally circular shape, disposed on the lower member 842 and spaced from the projection end covering the lower channels 8421 for limiting the flow of the working fluid through the lower member 842 to provide a damping force during the rebound stroke. It should be appreciated that, in one embodiment of the present invention, the plurality of second deflective discs 833 includes six discs. A second retainer 831 is disposed between the second rebound valve 83 and the projection end and spaced from the second rebound valve 83. A second spacer 832 is disposed between the second retainer 831 and the second rebound valve 83 to allow the second rebound valve 83 to deflect in response to a working fluid pressure during the rebound stroke. A fixing member 85 of a nut is disposed at the projecting end and attached to the projection end to secure the additional piston 8 to the projection 811. In other words, all components of the additional piston 8 are secured on the projection 811 by the fixing member 85. Hence, inner edges of the second compression valve 82 and the second rebound valve 83 are axially fixed which enables for their deflection after a certain velocity threshold is reached in order to enable for a more unrestricted flow of working liquid. It should be appreciated that the diameters of the deflective discs 823, 833 of the second compression valve 82 and the second rebound valve 83 can be substantially the same. In addition, the diameter and the numbers of the discs of the second compression and rebound valves 82, 83 and the number of upper and lower channels 8411, 8412 are constituted as tuning parameters that may obviously vary in other embodiments of the present invention.

A sealing ring 843, having a generally circular shape, is slidably disposed in the groove 8441 between the upper member 841 and the lower member 842. The sealing ring 843 is loosely disposed over the projection 811, spaced from the upper member 841 and the lower member 842, for movement in the groove 8441. The sealing ring 843 extends annularly about the projection 811 with the sealing ring 843 being radially expandable in response to the working fluid pressure to engage the main tube 3. It should be appreciated that the sealing ring 843 can be made from a polymeric material, in particular a modified Teflon polymeric material. As best illustrated in FIGS. 2-4, the sealing ring includes an inner surface facing the center axis A, an outer surface facing the main tube 3, an upper surface facing the upper member 841, and a lower surface facing the lower member 842. The sealing ring 843 further includes a chamfered surface 8433 connecting the outer surface with the upper surface and the lower surface to minimize the working fluid pressure exerted on the sealing ring 843. In other words, the chamfered surface 8433 reduces the working fluid pressure acting on the sealing ring 843 in a direction perpendicular to the center axis A and the bending moment acting on the sealing ring 843 in a direction perpendicular to the center axis A. In addition, a small sealing surface between the outer surface of the sealing ring 843 and the main tube 3 is obtained. All of the aforementioned factors reduce hydraulic imbalance and minimize the influence of any possible misalignment of the sealing ring 843 so that a risk of sucking the sealing ring 843 in a space between the additional piston 8 and the main tube 3 is minimized.

The sealing ring 843 includes at least one annular collar 8431, 8432 extending outwardly from the sealing ring 843 for forming a locking engagement with the upper member 841 and the lower member 842. As best shown in FIGS. 3-5, the at least one annular collar 8431, 8432 includes a compression collar 8431 and a rebound collar 8432. The compression collar 8431 extends annularly outwardly from the upper surface of the sealing ring 843, along the center axis A, toward the upper member 841 for engaging the upper member 841. The rebound collar 8432 extends annularly outwardly from the lower surface along the center axis A toward the lower member 842 for engaging the lower member 842. The upper member 841 defines an upper recess 8413, facing the sealing ring 843, extending annularly about the center axis A for receiving the compression collar 8431 to form the locking engagement with the compression collar 8431 of the sealing ring 843 during the compressions stroke. The lower member 842 defines a lower recess 8423, facing the sealing ring 843, extending annularly about the center axis A for receiving the rebound collar 8432 to form the locking engagement with the rebound collar 8432 of the sealing ring 843 during the rebound stroke. In other words, the compression collar 8431 and the rebound collar 8432 of the sealing ring 843 forms a T-shaped cross-section and form an interlock engagement with the upper recess 8413 and the lower recess 8423 during the compression and rebound stroke to limit the radial expansion of the sealing ring 843 in response to an increase in working fluid pressure to improve the durability of the sealing ring 843. This feature also prevents possible extrusion of the sealing ring 843 into the space between the main tube 3 and the upper member 841 under high and increasing pressure in the narrowed sections 33 and 34 of the main tube 3. In addition, the compression collar 8431 and the rebound collar 8432 of the sealing ring 843 increase the stiffness of the sealing ring 843. It should be appreciated that, instead of being disposed in the compression chamber 12, the additional piston 8 may be attached to the piston rod 5 in the rebound chamber 11 to generate the additional damping force at the end of the rebound stroke of the damper assembly 1. As shall be appreciated by those skilled in the art the invention, instead of a twin-tube damper assembly, the present invention is equally applicable for a mono-tube damper assembly.

FIG. 3 illustrated the operation of the additional piston 8 in the main tube 3 during the compression stroke. During the compression stroke, the additional piston 8 travels along the main section 31 of the main tube 3 toward the first end of the main tube 3. As the additional piston 8 travels along the first conical section 32 of the main tube 3, the working liquid flows out of the narrowed section 34 around the additional piston 8 to the main section 31 of the main tube 3. Upon entry to the second conical section 33, the working liquid may still flow around the additional piston 8. Nonetheless, as the diameter of the second conical section 33 diminishes, there is an increase in the working fluid restriction thereby creating an increase in the amount of the working fluid flow through the additional piston 8. As illustrated with a dashed arrow in FIG. 3, the working fluid will flow through the lower channels 8421, adjacent to the inner surface of the sealing ring 843, the upper channels 8411, and a gap under the deflected second compression valve 823. At a certain point, the working fluid pressure will cause the sealing ring 843 to expand radially to engage and slide along the internal wall of the main tube 3. In other words, while the additional piston 8 is in the narrowed section 34, the working liquid may flow out of the narrowed section 34 only through the additional piston 8 depicted with a dashed arrow. As the additional piston 8 engages the narrowed section 33, the engagement is smooth due to the small inclination of the second conical section 33.

FIG. 3 also illustrates an exaggerated case of a geometrical misalignment M between the center axis A of the main tube 3 of the damper assembly 1 and the axis A of the piston rod 81. This misalignment (M=|A−a|) is compensated as the sealing ring 843 is able to displace radially over the center portion 844. The grooves 8441 ensure the flow of the working liquid even if the sealing ring 843 radially covers the external surface of the center portion 844 such that the flow of the working liquid through the lower channels 8421 and upper channels 8411 is unrestricted. The rebound collar 8432 may cooperate or engage with an annular recess 8423 shaped in the adjoining rebound annular member 842 forming a sealing/toggling arrangement at the rebound side thereof.

As shown in FIG. 4, during the rebound stroke, the pressure of the working liquid acting on a sealing ring 843 displaces the sealing ring 843 towards the lower member 842. As illustrated with a dashed arrow, the working liquid may flow out of the main section 31 of the main tube 3 and into the narrowed section 34, through the lower channels 8421 of the lower member 842 and through a gap under the deflected second rebound valve 833. The rebound collar 8432 cooperates or engages with the lower recess 8423 shaped in the adjoining lower member 842 forming a sealing/toggling arrangement.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A damper assembly comprising;
a main tube disposed on a center axis and extending between a first end and a second end defining a fluid chamber for containing a working fluid;
a main piston slidably disposed in said fluid chamber dividing said fluid chamber into a rebound chamber and a compression chamber with said compression chamber being between said first end and said main piston and said rebound chamber being between said second end and said main piston;
a piston rod disposed on said center axis and attached to said main piston for moving said main piston between a compression stroke and a rebound stroke;
an additional piston attached to said piston rod adjacent to said main piston for providing additional damping force;
said additional piston including a body having an upper member and a lower member and defining a groove between said upper member and said lower member;
a sealing ring disposed in said groove between said upper member and said lower member for movement in said groove with said sealing ring being radially expandable in response to a working fluid pressure to engage said main tube during said compression stroke and said rebound stroke; and
said sealing ring including an outer surface facing said main tube, an upper surface facing said upper member, and a lower surface facing said lower member and at least one annular collar extending outwardly from said sealing ring for forming a locking engagement with said upper member and said lower member to limit the radial expansion of said sealing ring.

2. The damper assembly as set forth in claim 1 wherein said at least one annular collar includes a compression collar extending annularly outwardly from said upper surface along said center axis toward said upper member for engaging said upper member.

3. The damper assembly as set forth in claim 2 wherein said upper member defines an upper recess facing said sealing ring to form said locking engagement with said compression collar during said compressions stroke.

4. The damper assembly as set forth in claim 1 wherein said at least one annular collar includes a rebound collar extending annularly outwardly from said lower surface toward said lower member for engaging said lower member.

5. The damper assembly as set forth in claim 4 wherein said lower member defines a lower recess facing said sealing ring for receiving said sealing ring and allowing said sealing ring to form said locking engagement with said rebound collar during said rebound stroke.

6. The damper assembly as set forth in claim 1 wherein said sealing ring further including a chamfered surface connecting said outer surface with said upper surface and said lower surface to minimize the working fluid pressure exerted on the sealing ring.

7. The damper assembly as set forth in claim 1 wherein said sealing ring has a generally circular shape and is made from a polymeric material.

8. The damper assembly as set forth in claim 1 wherein said sealing ring is being made from modified Teflon polymeric material.

9. The damper assembly as set forth in claim 1 further including an external tube disposed on said center axis spaced from said main tube and extending about said main tube between a closed end adjacent to said first end and an opened end adjacent to said second end defining a compensation chamber extending between said main tube and said external tube.

10. The damper assembly as set forth in claim 1 wherein said main tube including a main section of generally cylindrical shape disposed on said center axis and having a first predetermined diameter with said main section extending from said second end of said main tube along said center axis to a first conical section extending outwardly from said main section along said center axis and tapering from said main tube toward said center axis.

11. The damper assembly as set forth in claim 10 wherein said main tube further including a second conical section extending outwardly from said first conical section along said center axis and tapering from said first conical section at a predetermined angle toward said center axis to a narrowed section extending between said second conical section and said first end of said main tube and having a second predetermined diameter with said second predetermined diameter being less than said first predetermined diameter.

12. The damper assembly as set forth in claim 11 wherein said predetermine angle is approximately 1.6 degree relative to said first conical section.

13. The damper assembly as set forth in claim 11 wherein said narrowed section defining at least one slot disposed in said rebound chamber and extending along said main tube parallel to said center axis.

14. The damper assembly as set forth in claim 1 wherein said upper member defines a plurality of upper channels disposed about said center axis, radially and circumferentially spaced from one another, and extending through said upper member for allowing the working fluid to flow through said upper member.

15. The damper assembly as set forth in claim 14 wherein said lower member defining a plurality of lower channels disposed about said center axis, radially and circumferentially spaced from one another, in alignment with said upper channels, and extending through said lower member for allowing the working fluid to flow through said lower member.

* * * * *